UNITED STATES PATENT OFFICE.

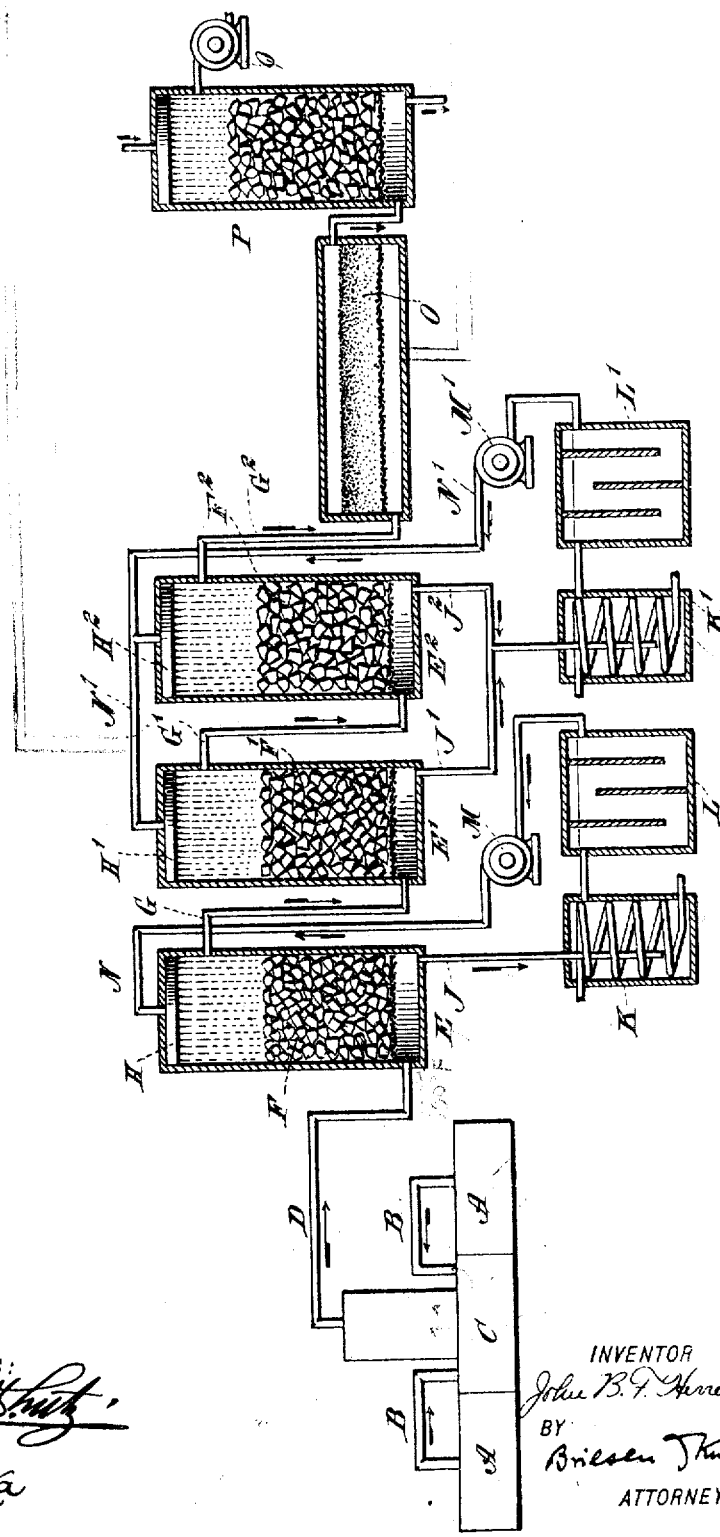

JOHN BROWN FRANCIS HERRESHOFF, OF NEW YORK, N. Y., ASSIGNOR TO GENERAL CHEMICAL COMPANY, OF NEW YORK, N. Y., A CORPORATION OF NEW YORK.

PURIFICATION OF BURNER-GASES.

940,595.  Specification of Letters Patent.  Patented Nov. 16, 1909.

Application filed February 10, 1906. Serial No. 300,364.

*To all whom it may concern:*

Be it known that I, JOHN BROWN FRANCIS HERRESHOFF, a citizen of the United States, and resident of the borough of Manhattan, city, county, and State of New York, have invented certain new and useful Improvements in the Purification of Burner-Gases, of which the following is a specification.

My invention relates to the purification of burner gases such as are produced from sulfid ores and other materials used in the manufacture of sulfuric acid, and especially to a purification which will render such gases suitable for the manufacture of sulfuric anhydrid and of sulfuric acid by the so-called contact process in which the sulfur dioxid contained in such gases is caused to combine with oxygen by the catalytic action of platinum or equivalent material.

The continued efficiency of the contact process for the manufacture of sulfuric anhydrid depends among other things upon the proper purification of the burner gases before they are allowed to enter the contact chamber. It has been found that the purification preceding the catalytic process should be so conducted as to remove certain detrimental impurities among which I will name particularly sulfuric acid (present in the form of mist), sulfur, arsenic, antimony, selenium, tellurium, and hydrofluoric acid. The failure to eliminate these bodies before the catalytic reaction occurs will materially reduce the efficiency of the contact process, such bodies acting, as it were, as a poison by diminishing or destroying the catalytic activity of the platinum. On the other hand, nitrogen, which is a constituent of the burner gas mixture and which does not enter into the reaction, may be carried along with the purified gases without any detrimental effect on the contact process.

My present invention relates to an improved process for purifying gases containing $SO_2$ and particularly burner gases, which process involves the removal from the said gases, of arsenic, sulfur, sulfuric acid mist, and other detrimental impurities which occur in burner gases, leaving as the useful product of the operation a pure burner gas, that is, a gas consisting of sulfur dioxid, oxygen, and inert gases, chiefly nitrogen, in substantially the same amount which was contained in the original impure burner gas; this purified burner gas can then proceed on its way to further treatment, as by catalytic conversion into $SO_3$.

While the exact manner of carrying out my invention will vary more or less according to the constitution of the impure burner gases and particularly according to the nature of the detrimental impurities contained therein, certain general principles of operation such as pointed out in the appended claims, will be observed.

I have described hereinafter a particular embodiment of my invention but it will be understood that variations, as long as they remain within the scope of the appended claims, will constitute no departure from the nature of my invention.

Reference is to be had to the accompanying drawing, which is a diagrammatic view, partly in section, of a plant such as may be employed in carrying out my present invention.

A designates furnaces where the ore is roasted. The furnace gases or burner gases pass through conduits B into a dust chamber C of a cross section considerably greater than that of the conduits B, so that the gases will move more slowly in the dust chamber C, allowing the suspended solid particles to settle out therein. From this chamber C the gases pass through another conduit D to the cooling and scrubbing tower E, the path of the gases to said tower being such that their temperature is reduced to about 650° F. at their entrance into the tower. The gases pass upward in the tower E which contains a filling F of quartz stones or other suitable material, and a large quantity of a purifying liquid, preferably cool weak sulfuric acid, (for instance of 40° Bé.) trickles downward over the filling. This treatment with finely divided cool weak sulfuric acid has a double effect, one of which is to further cool the gases, and the other to scrub them. The chief constituents of the burner gases are $SO_2$, O, and N. The gases also contain various liquid and solid impurities, and the settling and scrubbing system has to be so designed that it will eliminate with practical completeness all of the solid impurities. The sulfur, like solid (sublimed) arsenic, has a very detrimental influence on the activity of the contact substance.

The liquid impurities such as dissolved arsenic occur in the sulfuric acid, which is always formed when roasting sulfids and which in the gases is present in the nature of a mist, and it has been found that if such sulfuric acid is carried along through the remainder of the purifying process it seriously interferes with the efficiency of said process, requiring a very thorough and more lengthy purification than is necessary otherwise. Furthermore, the presence of sulfuric acid in the contact chambers interferes with the efficiency of the catalytic action. The arsenic, (as well as HFl and Se) is also dangerous to the catalytic activity of the platinum, and must be removed before the gases enter the contact chamber, or such arsenic will soon diminish the activity of the contact mass to a very material extent.

The preliminary cooling of the gases on their way to the cooling and scrubbing tower E is of assistance, as it enables the gases to be purified more readily when they come in contact with the weak acid trickling down in said tower. In the scrubbing tower the purification of the burner gases from S, $H_2SO_4$, As and other detrimental impurities is carried on very efficiently owing to the large surface and to the intimate contact of the gases with the liquid which is brought about by the fine division of the weak acid.

If desired, and I consider this preferable, the gases may be passed in succession through several scrubbing towers. Thus, the drawing shows two additional scrubbing towers E', E², with fillings F', F² of the same character as hereinbefore described. Pipes G, G' connect the upper portion of one tower with the lower portion of the next and serve to convey the gases. The spray heads for supplying the weak acid are indicated at H, H', H², and the outlets for the weak acid at J, J', J². I prefer to use the same body of acid over and over again, and for this purpose, the acid from the outlet J passes into a cooler K and then through a settling box L having baffle-boards or other means for causing impurities to be thrown down. A pump M returns the cooled and purified acid through a pipe N to the spray head H. The acid from the towers E', E² is preferably led to the same cooler K', then to the settling box L', and finally brought back to the spray heads H', H², through the pipe N', by the pump M'. The cooling of the acid is required because it becomes heated in the scrubbing towers, and on the other hand the acid should be cool to perform its work efficiently. Some $SO_2$ is of course absorbed by the weak acid, but the acid soon becomes saturated with that amount of $SO_2$ which it can absorb at the temperature to which it is heated in the scrubbing towers. The cool acid does indeed absorb an additional amount of $SO_2$, but as the acid becomes heated, this additional amount is liberated in the scrubbing towers and passes along with the gases. The towers E, E', E², as well as the coolers K, K', and settling boxes L, L', should be closed to the atmosphere so as to prevent the escape of any $SO_2$ which may be liberated in any one of these apparatus.

The purification in the scrubbing towers should be so thorough that the solid impurities will be practically eliminated and will not perceptibly affect the operation of the remainder of the apparatus. The gases thus deprived of the solid impurities, of a portion of the liquid mist, and of gaseous impurities as well, pass through the conduit $G^2$ to the filter O, preferably filled with fine, dry sand, coke or other medium, therefore it is very important that no solid matter should be permitted to enter the filter. The filter is of great area and depth. In this filter, the acid mist containing As, and most of the moisture, are removed from the gases and the purification is completed. Finally, the gases are dried in a drying tower P by contact with concentrated sulfuric acid trickling down in the usual way. A blower Q or other suitable device is employed for causing the gases to follow the path set forth. The purified gases pass on to the contact chamber or other apparatus.

The process hereinbefore described removes the $H_2SO_4$, S, HFl, As and other detrimental impurities from the burner gases but leaves the contents of $SO_2$ and of other constituents, that is, chiefly O and N, practically unaltered. Those constituents therefore, $SO_2$ and O, which are the active constituents in the contact process, and N, which is inert, are preserved in their practical entirety, while the detrimental impurities are removed.

The gases, at the end of the purifying process herein described, should satisfy an optical test showing their practically absolute freedom from solid or liquid matter.

I claim as my invention:

1. The herein described process of purifying gases containing $SO_2$, which consists in bringing the gases into contact with a minutely distributed body of weak acid containing absorbed $SO_2$, and exposing them to the action of such acid until the solid impurities have been practically eliminated, and then removing non-solid impurities by filtration.

2. The herein described process of purifying gases containing $SO_2$, which consists in bringing the gases into contact with a minutely distributed body of weak acid containing absorbed $SO_2$, and exposing them to the action of such acid until the solid impurities have been practically eliminated, removing such acid from contact with the gases, cooling and purifying it and returning it into contact with the gases, and thereupon removing the liquid impurities from the gases by filtration.

In testimony whereof, I have hereunto set my name, in the presence of two subscribing witnesses.

JOHN BROWN FRANCIS HERRESHOFF.

Witnesses:
JOHN LOTKA,
JOHN A. KEHLENBECK.